G. H. POIST.
GAMBREL STICK.
APPLICATION FILED JAN. 21, 1908.
916,010.
Patented Mar. 23, 1909.
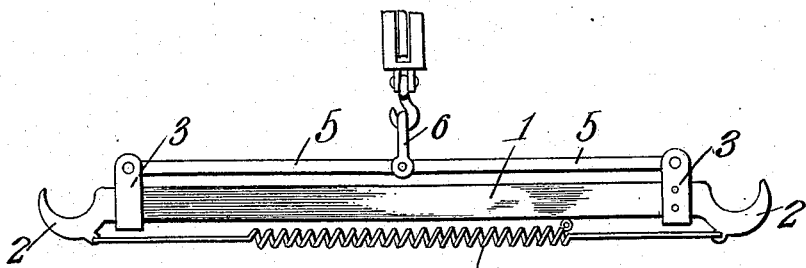
Fig.1.
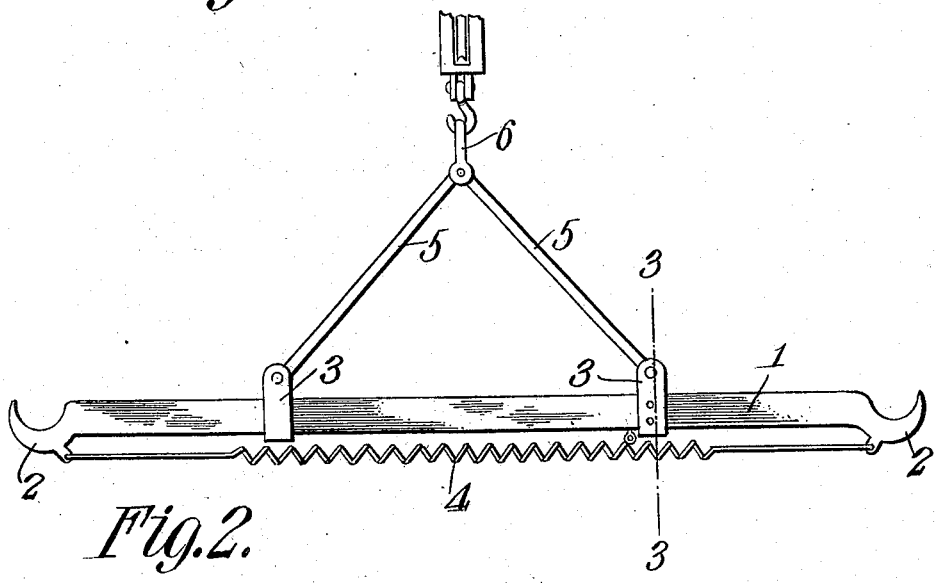
Fig.2.
Fig.3.
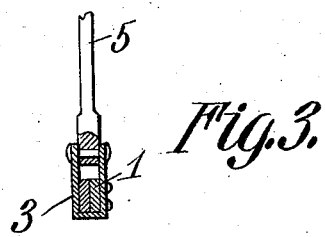
Witnesses
Inventor
George H. Poist.
By C. A. Snow & Co.
Attorneys

UNITED STATES PATENT OFFICE.

GEORGE HESTON POIST, OF PORT DEPOSIT, MARYLAND.

GAMBREL-STICK.

No. 916,010.　　　Specification of Letters Patent.　　Patented March 23, 1909.

Application filed January 21, 1908. Serial No. 411,966.

*To all whom it may concern:*

Be it known that I, GEORGE H. POIST, a citizen of the United States, residing at Port Deposit, in the county of Cecil and State of Maryland, have invented a new and useful Gambrel-Stick, of which the following is a specification.

This invention has relation to gambrel sticks and it consists in the novel construction and arrangement of its parts as hereinafter shown and described.

The object of the invention is to provide a gambrel stick made up of longitudinally movable sections which are connected together by a coil spring and which are also connected by pivoted links which in turn are pivotally connected together at their inner ends by a suspending eye. The parts are so arranged that when a carcass is hung upon hooks provided at the ends of the members and the stick is held in suspended position as the carcass is split or cut in two the hook ends of the members will move away from each other so that the sides of the carcass are sufficiently separated in order not to interfere with the knife or saw used in dividing the same.

Figure 1 is a side elevation of the stick showing the members in one position. Fig. 2 is a side elevation of the stick showing the members extended, and Fig. 3 is a transverse sectional view of the stick cut on the line 3, 3 of Fig. 2.

The stick consists of the members 1 each of which is provided at its outer end with a hook 2 and at its opposite end with a loop 3. The coil spring 4 connects the said hooks 2, 2 together and is under tension with a tendency to draw the said hooks toward each other. The outer ends of the links 5 are pivotally connected to the loops 3 and the inner ends of the said links are pivotally connected together and to the suspending eye 6. The combined length of the links 5 is substantially the same as the distance between the loops 3, 3 when the hooks 2, 2 are in the nearest positions to each other so that the said links 5 are substantially parallel with the members 1 when the said hooks are in the nearest proximity to each other. When the eye 6 is engaged with the hook of a block and the shins of a carcass are caught upon the hooks 2, 2 the weight of the carcass will cause the links 5 to assume an angle with relation to each other and the members 1 will move longitudinally with relation to each other and against the tension of the spring 4. Thus the weight of the carcass has a tendency to separate the quarters thereof and as the carcass is divided by a knife or saw the hooks 2, 2 will continue to separate so that the sides of the carcass will not interfere with the operation of the dividing implement. As soon as the carcass is removed from the hooks 2 of the gambrel stick the tension of the spring 4 comes into play and the hooks 2, 2 are drawn together and the links 5 are moved substantially into alinement with each other and parallel with the members 1.

Having described my invention, what is claimed is:

A gambrel stick comprising members each having a loop which receives the other member, a spring connecting the members together, links pivotally connected with said loops and a suspending eye pivotally connected with the links.

In testimony that I claim the foregoing as my own, I have hereto affixed my signature in the presence of two witnesses.

GEORGE HESTON POIST.

Witnesses:
　L. E. SIMPSON,
　R. V. ATKINSON.